(12) United States Patent
Noguchi

(10) Patent No.: US 7,414,802 B2
(45) Date of Patent: Aug. 19, 2008

(54) LENS APPARATUS AND CAMERA

(75) Inventor: Kazuhiro Noguchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/844,761

(22) Filed: Aug. 24, 2007

(65) Prior Publication Data
US 2008/0002264 A1  Jan. 3, 2008

Related U.S. Application Data

(63) Continuation of application No. 10/737,140, filed on Dec. 15, 2003, now Pat. No. 7,283,315.

(30) Foreign Application Priority Data
Dec. 18, 2002  (JP) .............................. 2002-367269

(51) Int. Cl.
*G02B 7/02* (2006.01)
(52) U.S. Cl. ........................ 359/819; 359/821; 359/822; 359/823
(58) Field of Classification Search ................. 359/819, 359/811, 813, 814, 817, 821, 822, 823, 824, 359/825
See application file for complete search history.

(56) References Cited

U.S. PATENT DOCUMENTS 6,741,404 B2    5/2004  Ue et al. ...................... 359/811
7,330,317 B2 *  2/2008  Onishi et al. ................ 359/697

FOREIGN PATENT DOCUMENTS

JP    2000-304999    11/2000

* cited by examiner

*Primary Examiner*—Timothy J Thompson
(74) *Attorney, Agent, or Firm*—Morgan & Finnegan, LLP

(57) ABSTRACT

A lens apparatus capable of realizing better optical performance by suppressing an inclination of each lens unit more reliably while shortening the overall length in a collapsed position to the smallest possible level is disclosed. The lens apparatus comprises a fixed member which makes up the body of the apparatus, first and second lens holding members which hold their respective lens units and are movable in the direction of the optical axis with respect to the fixed member and a driving member which engages the first and second lens holding members and drives these first and second lens holding members in the direction of the optical axis.

6 Claims, 12 Drawing Sheets

LENS APPARATUS AND CAMERA

This is a continuation of prior application Ser. No. 10/737,140, filed Dec. 15, 2003 now U.S. Pat. No. 7,283,315, to which priority under 35 U.S.C. § 120 is claimed and which is hereby incorporated by reference in its entirety as if fully set forth herein.

This application also claims priority under 35 U.S.C. § 119 from Japanese Patent Application No. 2002-367269 filed on Dec. 18, 2002 in Japan, which is also incorporated by reference herein.

BACKGROUND OF THE INVENTION

1. Field of the Invention

The present invention relates to a telescopic lens apparatus having a plurality of lens units, and a camera.

2. Description of the Related Art

Conventionally, image-taking apparatuses such as a small camera which takes pictures using a silver film and a digital still camera which causes an image pickup element such as a CCD to photoelectrically convert an optical image, electrically reads image information and records it in a recording medium such as a memory are provided with a so-called collapse type lens-barrel which is housed in the body of the image-taking apparatus when not in use with its overall length shortened from the length of the lens-barrel when the apparatus is in use for the purpose of improving portability.

There are various proposals of a configuration of a collapse type lens-barrel. For example, in Japanese Patent Application Laid-Open No. 2000-304999 (Document 1), a collapse type lens-barrel is disclosed. The collapse type lens-barrel performs a magnification varying operation and collapses the entire lens-barrel by rotating a cam member (cam frame) provided with a plurality of cams on its inner surface or outer surface around the optical axis and moving a plurality of lens holding members (lens frames) engaged with their respective cams through a cam pin forward or backward in the direction of the optical axis.

Furthermore, with an increasing number of pixels and miniaturization of image pickup elements in recent years, there is an increasing demand for a lens-barrel having an image-taking optical system with higher performance. There is also an increasing demand for a small image-taking apparatus with a zoom lens of a high magnification varying ratio.

In the lens-barrel proposed in the above described Document 1, a second lens holding member (second lens frame) is guided in the direction of the optical axis by a guide shaft which protrudes from a fixed member (fixed frame) and the inclination of the second lens holding member is suppressed through a sleeve portion of a predetermined length engaged with the guide shaft.

However, the second lens holding member is supported only through the guide shaft and only one end of the guide shaft is supported by the fixed member, and therefore especially when the second lens holding member moves in front of the guide shaft, the guide shaft is easily bent by a force transmitted from the cam member through the cam pin, etc., an inclination of the second lens unit with respect to the designed optical axis of the overall lens system occurs, resulting in a problem that satisfactory optical performance is not acquired.

Furthermore, trying to repress the inclination of the second lens holding member by increasing the length of engagement of the sleeve portion with respect to the guide shaft results in another problem that the presence of the long sleeve portion prevents the full length of the lens-barrel from being fully shortened when it is in a collapsed state.

SUMMARY OF THE INVENTION

One aspect of the lens apparatus of the present invention comprises a fixed member which constitute a body of the apparatus, first and second lens holding members which hold respective lens units and are movable with respect to the fixed member in the direction of the optical axis and a driving member which engages with the first and second lens holding members and drives these first and second lens holding members in the direction of the optical axis. Here, the fixed member is provided with a support portion which supports the first lens holding member in a direction perpendicular to the optical axis and the second lens holding member is provided with a first supported portion which is supported by the first lens holding member in the direction perpendicular to the optical axis and a second supported portion which is supported by the fixed member in the direction perpendicular to the optical axis at positions away from each other in the direction of the optical axis at least two locations around the optical axis.

One aspect of the camera of the present invention comprises the above described lens apparatus and a recording unit which records the image of an object formed by the lens apparatus.

Feature of the lens apparatus and camera of the present invention will become apparent from the following more specific descriptions of embodiments with reference to the attached drawings.

DETAILED DESCRIPTION OF THE PREFERRED EMBODIMENTS

With reference now to the attached drawings, embodiments of the present invention will be explained below.

Embodiment 1

With reference to the attached drawings, Embodiment 1 of the present invention will be explained below. FIG. 1 to FIG. 5 show a lens-barrel of this embodiment. This lens-barrel is mounted on a camera body (not shown) or incorporated in the camera body as an integral part thereof.

The above described lens-barrel has a magnification varying image-taking optical system including four lens units; convex, concave, convex and convex lens units from the front side (object side) in the direction of the optical axis. Furthermore, this lens-barrel is a so-called collapse type lens-barrel whose substantially whole body is housed in the camera body when the camera is not in use by shortening the distances between the respective lens units of the magnification varying image-taking optical system from their distances when the camera is in use and thereby shortening the overall length of the lens-barrel.

Figure 1:
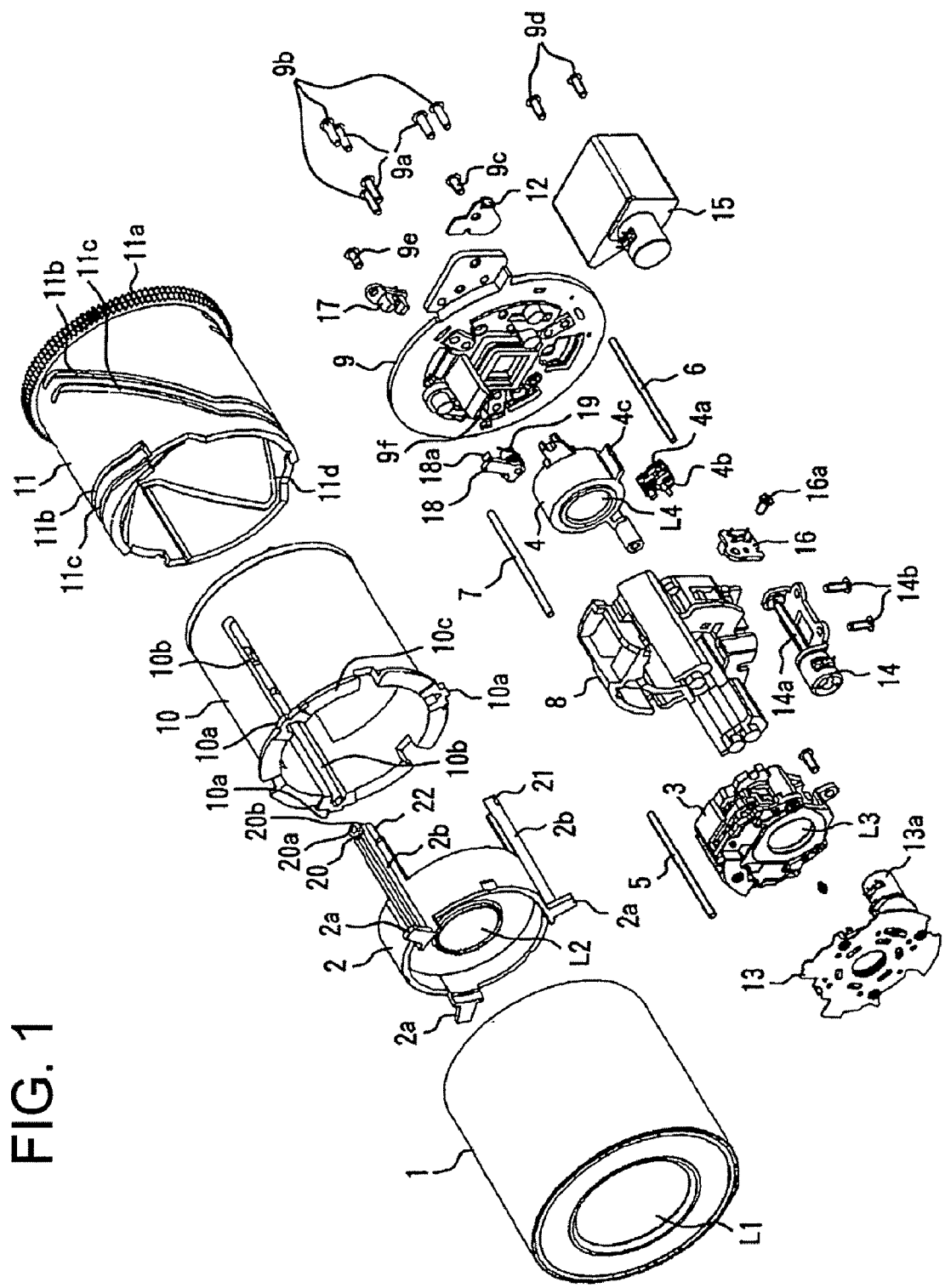
FIG. 1 is an exploded perspective view of a lens-barrel which is Embodiment 1 of the present invention.
Figure 2:
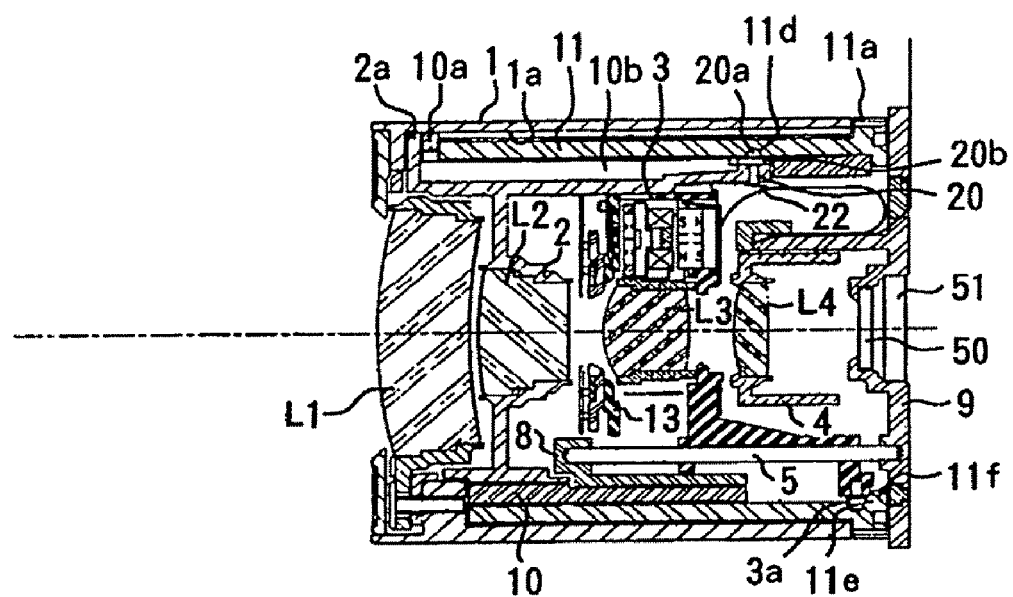
FIG. 2 is a cross-sectional view of the lens-barrel of Embodiment 1 (in a collapsed state)
Figure 3:
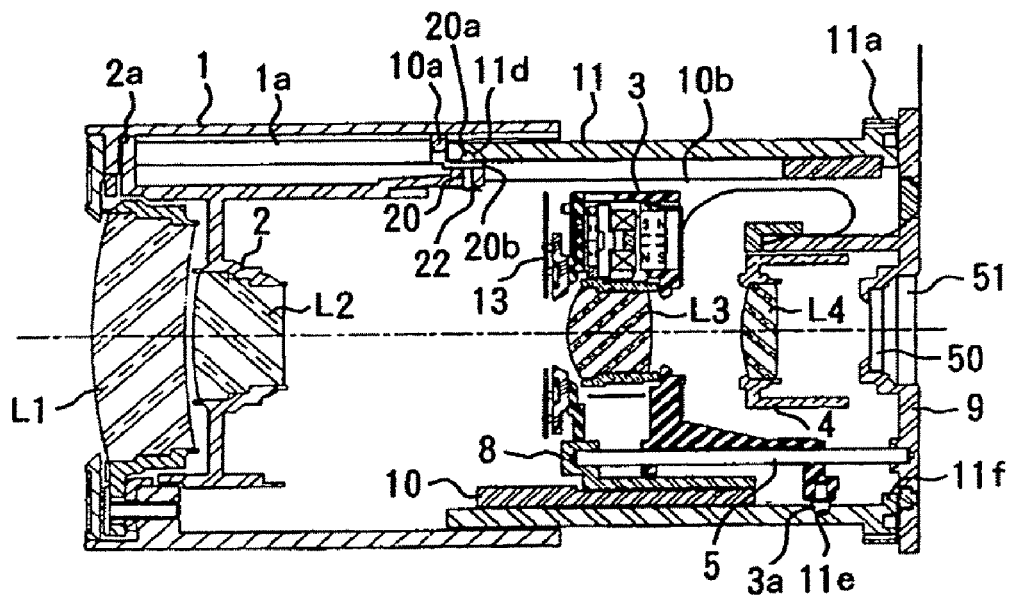
FIG. 3 is a cross-sectional view of the lens-barrel of Embodiment 1 (WIDE end)
Figure 4:
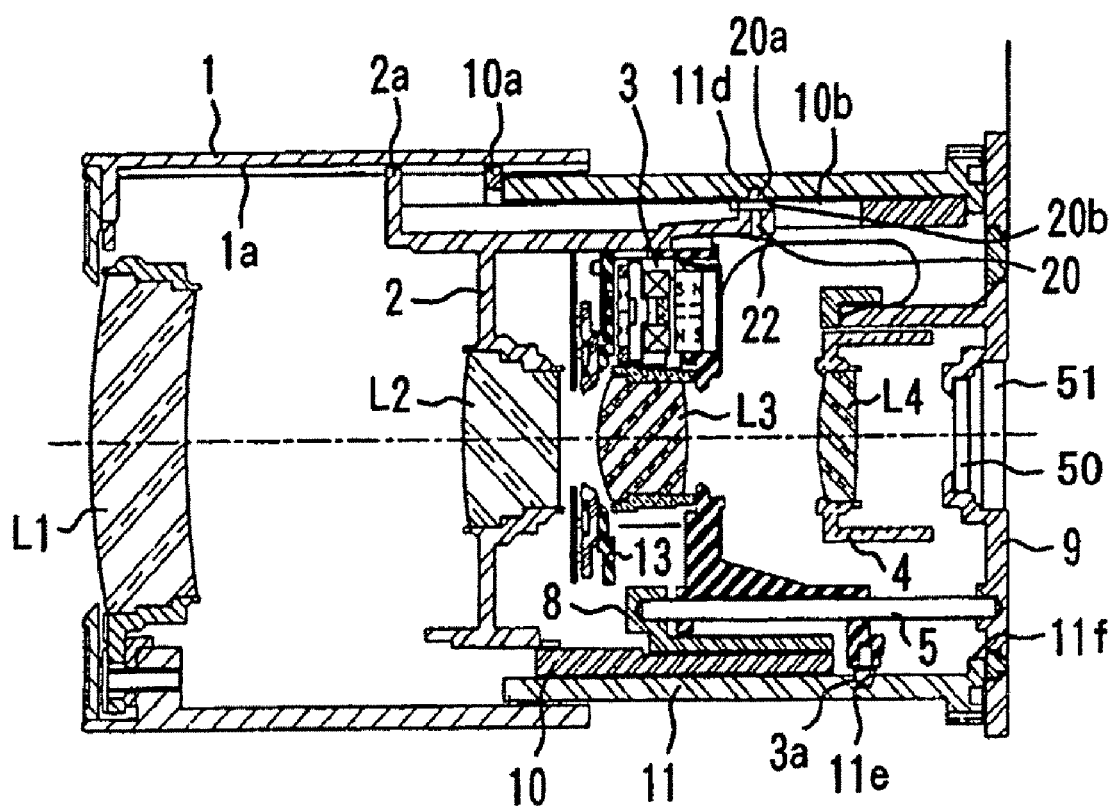
FIG. 4 is a cross-sectional view of the lens-barrel of Embodiment 1 (TELE end)
Figure 5:
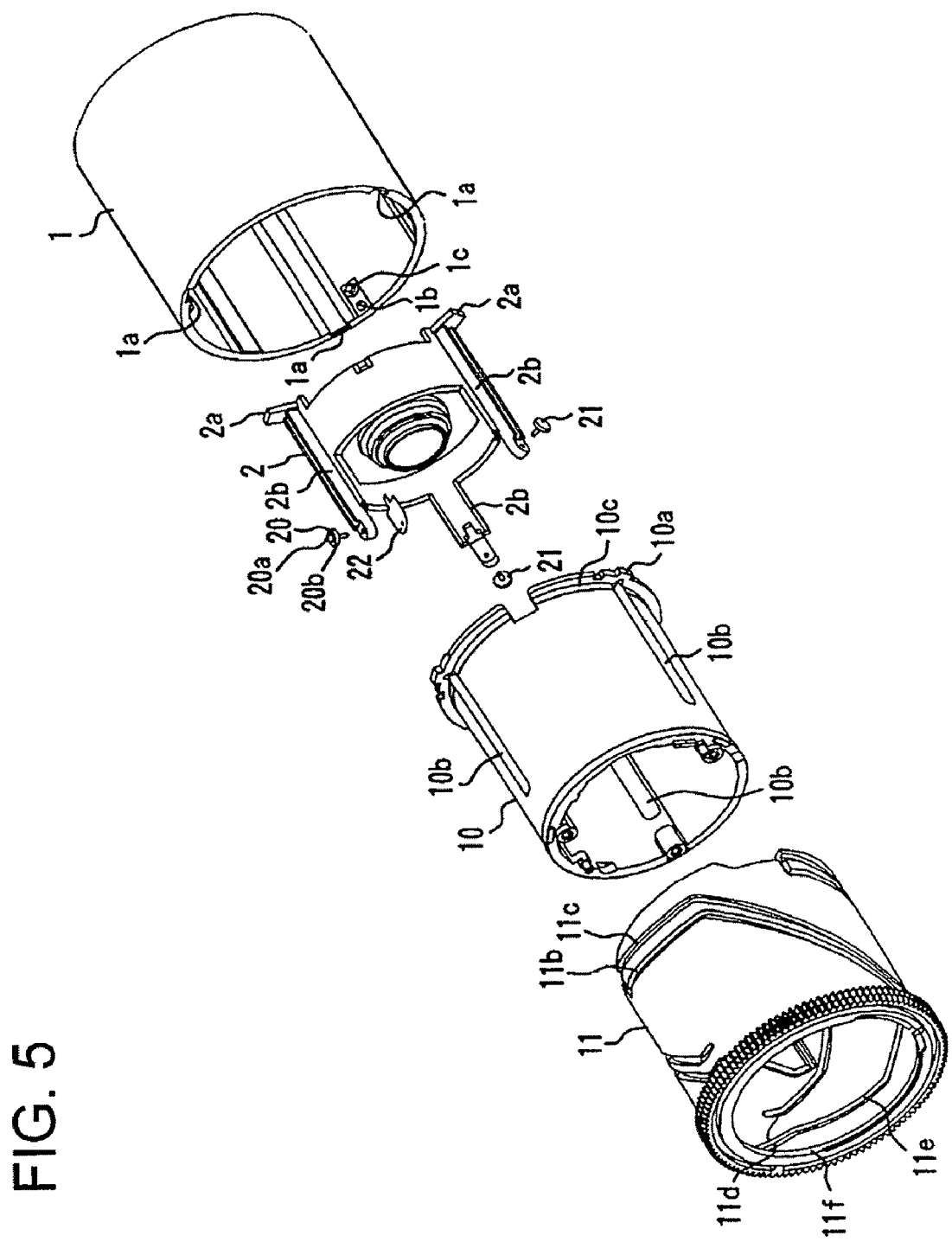
FIG. 5 is an exploded perspective view of support structures of first and second lens holding members in the lens-barrel of Embodiment 1.

Here, FIG. 1 is an exploded perspective view of the lens-barrel viewed from the front, FIG. 2 is a cross-sectional view of the main components of the lens-barrel in a collapsed state, FIG. 3 is a cross-sectional view of the main components of the lens-barrel at the widest angle (WIDE end) and FIG. 4 is a cross-sectional view of the main components of the lens-barrel at the maximum telephoto position (TELE end). FIG. 5 is an exploded perspective view of some components of the lens-barrel viewed from the back.

In these figures, reference character L1 denotes a first lens unit which is movable in the direction of the optical axis, L2 denotes a second lens unit which is movable in the direction of the optical axis, L3 denotes a third lens unit which is movable in the direction of the optical axis and shifts within the orthogonal plane to the optional axis to correct vibration of images caused by movement of hand, etc. Lens units L1 to L3 are arranged sequentially from the front side of the lens-barrel. Magnification is changed through movements of the first to third lens units in the direction of the optical axis. Reference character L4 denotes a fourth lens unit which moves in the direction of the optical axis for focusing.

Reference numeral 1 denotes a first holding unit (first lens holding member) which holds the first lens unit L1 and 2 denotes a second holding member (second lens holding member) which holds the second lens unit L2. Reference numeral 3 denotes a shift unit which holds the third lens unit L3 in a manner drivable within a plane orthogonal to the optical axis and 3a denotes a cone-shaped cam pin which is fixed in the rear end portion of the shift unit 3 through press fitting, etc.

Reference numeral 4 denotes a fourth holding member which holds the fourth lens unit L4, reference numerals 5, 6 and 7 denote guide bars which support the shift unit 3 and fourth holding member 4 in a manner movable in the direction of the optical axis. The shift unit 3 is supported by the guide bars 5 and 6 and the fourth holding member 4 is supported by the guide bars 7 and 6.

Reference numeral 8 denotes a support frame which positions and fixes the front ends of the guide bars 5, 6 and 7, reference numeral 9 denotes a rear lens-barrel which positions and fixes the rear ends of the guide bars 5, 6 and 7 and holds an image pickup element (recording unit) 51 such as a CCD and CMOS sensor and an optical low pass filter 50 located in front of the image pickup element 51. The support frame 8 is fixed to the rear lens-barrel 9 by three screws 9a.

Reference numeral 10 denotes a fixed member which constitutes the body of the lens-barrel (body of the apparatus). The rear lens-barrel 9 is fixed to the rear end of the fixed member 10 by three screws 9b.

Reference numeral 11 denotes a cam member (driving member) and is held in a manner rotatable around the fixed member 10. A rearward movement in the direction of the optical axis of the rear end of the cam member 11 is blocked by the rear lens-barrel 9 and a forward movement in the direction of the optical axis of the front end thereof is blocked by a flange portion 10c formed at the front end of the fixed member 10 in such a way as to extend beyond the outer edge of the fixed member 10 in the diameter direction.

The cam member 11 includes cam groove portions 11b, 11c, 11d and 11e (see FIG. 5) on the outer surface and inner surface. A cam follower pin 1b and anti-shock pin 1c (see FIG. 5) provided on the inner surface of the first holding unit 1 engage with the cam groove portions 11b and 11c provided on the outer surface of the cam member 11, a cam follower pin 20 provided on the outer radius side of the rear end of the second holding member 2 engages with the cam groove portion 11d provided on the inner surface of the cam member 11 and a cam follower pin 3a provided on the outer radius side of the rear end of the shift unit 3 engages with the cam groove portion 11e provided on the inner surface of the cam member 11. In this way, as will be explained later, when the cam member 11 rotates around the fixed member 10 (around the optical axis), the first holding unit 1, second holding member 2, and shift unit 3 (that is, first, second and third lens units L1, L2 and L3) move along the cam groove portions 11b, 11c, 11d and 11e in the direction of the optical axis and carry out a magnification varying operation between the WIDE end and TELE end (hereinafter referred to as "zoom area"). In the same way, they carry out zoom-out and zoom-in operations in the collapse area between the WIDE end and collapsed position.

Reference numeral 12 shown in FIG. 1 denotes a stopper for restricting the rotation of the cam member 11 so as to prevent the first holding unit 1, the second holding member 2 and the shift unit 3 from coming off the cam member 11 when the cam member 11 has rotated up to their built-in positions and the stopper 12 is fixed to the rear lens-barrel 9 by a screw 9c.

Reference numeral 13 denotes a stop unit which controls the aperture diameter of the image-taking optical system and the stop unit 13 is a so-called iris type stop unit which changes the aperture area of the stop by moving a plurality of stop blades (reference numerals are not assigned).

Reference numeral 14 denotes a focus motor unit serving as a drive source which drives the fourth lens unit L4 in the direction of the optical axis and the focus motor unit 14 is fixed to the support frame 8 by two screws 14b. The focus motor unit 14 includes a lead screw 14a formed concentric with a rotating rotor. The fourth holding member 4 is provided with a rack 4a and the rack 4a engages with the lead screw 14a. In this structure, when power is supplied to the focus motor unit 14 and the lead screw 14a rotates, the fourth holding member 4 (that is, fourth lens unit L4) is driven in the direction of the optical axis through the engagement between the lead screw 14a and rack 4a.

The fourth holding member 4, guide bars 6 and 7, rack 4a and lead screw 14a are mutually pushed to one side by a spring force of a helical torsion spring 4b, thus suppressing backlash between those components.

Reference numeral 15 denotes a zoom motor serving as a drive source which rotates and drives the cam member 11 and the zoom motor 15 is fixed to the rear lens-barrel 9 by two screws 9d. An output gear (not shown) of the zoom motor 15 engages with a gear portion 11a formed at the rear end of the cam member 11 and it is possible to rotate and drive the cam member 11 by supplying power to the zoom motor 15 and rotating it.

Reference numeral 16 denotes a focus reset switch made up of a photointerruptor and is fixed to the support frame 8 by a screw 16a. The focus reset switch 16 optically detects switching between a light-blocking state and light transmitting state which are generated by a light-blocking portion 4c formed on the fourth holding member 4 moving forward and backward between a light projecting portion and light receiving portion of the focus reset switch 16 depend on the movement of the fourth holding member 4, and outputs an electric signal to a microcomputer which will be described later. The microcomputer detects whether the fourth lens unit L4 is at a reference position or not on the basis of output signal of the focus reset switch 16.

Reference numeral 18 denotes a lever, which can rotate around a pin 9f provided on the rear lens-barrel 9. The end of the lever 18 is pressed against a cam 11f (see FIG. 2 to FIG. 4 and FIG. 5) which has a lift in the diameter direction provided at the rear end of the inner radius of the cam member 11 by a spring force of a helical torsion spring 19 and the lever 18 rotates according to a change of the lift of the cam 11f accompanying the rotation of the cam member 11.

Reference numeral 17 denotes a zoom reset switch made up of a photointerruptor, which is fixed to the rear lens-barrel 9 by a screw 9e. The zoom reset switch 17 optically detects switching between a light-blocking state and light transmitting state which are generated by a light-blocking portion 18a formed on the lever 18 moving forward and backward between a light projecting portion and light receiving portion of the zoom reset switch 17 depend on the rotation of the lever 18, and outputs an electric signal to the above described microcomputer. The microcomputer detects whether the rotation position of the cam member 11 is at a reference position or not (that is, whether the first to third lens units L1 to L3 are at a reference position or not) on the basis of output signal of the zoom reset switch 17.

Then, the support structures of the first and second lens units L1 and L2 will be explained using FIG. 5. Three flat-shaped keys (support portions) 10a are provided on a flange portion 10c formed at the front end of the fixed member 10 at equiangular intervals in the circumferential direction. Three rectilinear groove portions 1a which extend in the direction of the optical axis and engage with the key 10a are formed on the inner surface of the cylindrical part of the first holding unit 1. The three keys 10a are inserted into the three rectilinear groove portions 1a respectively. This causes both sides of the keys 10a and both inner sides of the rectilinear groove portions 1a to contact with each other. There are three combinations between the key 10a and rectilinear groove portion 1a in the circumferential direction, which constrains the degree of freedom of movement of the keys 10a and rectilinear groove portions 1a in the direction of the bottom face and positions the fixed member 10 and the first holding unit 1 in the direction perpendicular to the optical axis. Furthermore, through the engagement between the side of the key 10a and the inner surface of the rectilinear groove portion 1a, the first holding unit 1 is guided in the direction of the optical axis.

Furthermore, three cam follower pins 1b and anti-shock pins 1c are provided at the rear end on the inner surface of the first holding unit 1 at equiangular intervals in the circumferential direction of the first holding unit 1. These cam follower pins 1b and anti-shock pins 1c are inserted into three cam groove portions 11b and 11c formed on the outer surface of the cam member 11 respectively. The cam follower pins 1b are taper pins which always engage with the cam groove portions 11b from the collapse area to the zoom area and when the cam member 11 rotates, the cam follower pins 1b receive a force from the cam groove portions 11b and the first holding unit 1 is driven in the direction of the optical axis.

Furthermore, since the cam follower pin 1b engages with the cam groove portion 11b, the inclination of the first holding unit 1 with respect to the optical axis in the lens-barrel (design optical axis of image-taking optical system) is suppressed.

Thus, since the position of the first holding unit 1 in the direction perpendicular to the optical axis with respect to the fixed member 10 is determined by the fixed member 10 (keys 10a) and its inclination is suppressed by the cam member 11, even when the lens-barrel extends greatly as shown in FIG. 3 and FIG. 4, it is possible to minimize a deviation of the optical axis of the first lens unit L1 held by the first holding unit 1 from the optical axis of the lens-barrel.

On the other hand, the anti-shock pin 1c is a pin having a taper of a small angle close to the cylinder and inserted into the cam groove portion 11c, but it normally does not engage with the cam groove portion 11c. However, when an external force such as shock applies to the first holding unit 1 in the direction of the optical axis due to a drop of the camera, etc., the cam follower pin 1b which is always engaged with the cam groove portion 11b rises along the tapering surface of the cam groove portion 11b and almost comes off the cam groove portion 11b, but the anti-shock pin 1c contacts the cam groove portion 11c and prevents the cam follower pin 1b from coming off the cam groove portion 11b.

At three locations in the circumferential direction of the cylindrical part that holds the second lens unit L2 of the second holding member 2, there are extended portions 2b which extend in the direction of the optical axis at equiangular intervals in such a way as to protrude front and rear side of the cylindrical part. Flat-shaped keys (first supported portions) 2a are formed at the front end of the three extended portions 2b. A cam follower pin 20 having a taper pin portion 20a and cylindrical pin portion (second supported portion) 20b is attached to the rear end of one of the three extended portions 2b and a pin 21 having a cylindrical pin portion (second supported portion) is attached to the rear end of the remaining two extended portions 2b.

A shaft of the cam follower pin 20 is inserted into a through hole formed at the rear end of the extended portion 2b in a manner movable in the longitudinal direction of the shaft and shafts of two pins 21 are press fitted into a hole formed at the rear end of the extended portions 2b.

The three keys 2a are inserted into three rectilinear groove portions 1a formed in the first holding unit 1. That is, the key 10a of the aforementioned fixed member 10 and the key 2a of the second holding member 2 are inserted into the same rectilinear groove portion 1a of the first holding unit 1.

Through the contact between the both sides of the three keys 2a and both inner surfaces of the three rectilinear groove portions 1a, the second holding member 2 is supported (positioned) in the direction perpendicular to the optical axis by the first holding unit 1 which is positioned and supported by the fixed member 10 in the direction perpendicular to the optical axis. Furthermore, through the engagement of the side of the key 2a with the inner surface of the rectilinear groove portion 1a, the second holding member 2 is guided in the direction of the optical axis.

On the other hand, the cam follower pin 20 and pins 21 located in the rear in the direction of the optical axis away from the keys 2a are inserted into three rectilinear groove portions 10b formed in such a way as to extend in the direction of the optical axis with the same phases as those of the keys 10a in the cylindrical part of the fixed member 10. Through the engagement between the outer surfaces of the cylindrical pin portion 20b and pin 21 of the cam follower pin 20 and the inner surface of the rectilinear groove portion 10b, the second holding member 2 is supported to the fixed member 10 in such a way as to be positioned in the direction perpendicular to the optical axis. This suppresses the inclination of the second holding member 2. Furthermore, the second holding member 2 is guided by the rectilinear groove portions 10b in the direction of the optical axis.

The second holding member 2 is supported by the first holding unit 1 at its front end and its position with respect to the first holding unit 1 in the direction perpendicular to the optical axis is determined and supported at its rear end by the fixed member 10 and its position with respect to the fixed member 10 in the direction perpendicular to the optical axis is determined. Thus, even when the first holding unit 1 moves in the direction perpendicular to the optical axis due to backlash in the engagement between the rectilinear groove portions 1a and keys 10a of the fixed member 10 and non-uniformity of the three cam groove portions 11b with which the three cam follower pins 1b engage respectively, the front end side of the second holding member 2 supported by the first holding unit 1 moves following the first holding unit 1, which makes it possible to suppress a relative positional difference (optical axis difference) between the first lens unit L1 and second lens unit L2 to a minimum level.

Using above described support structure for the second holding member 2 eliminates the need to form a sleeve portion having a long engagement length with respect to the guide bars in the second holding member 2. Therefore, it is possible to shorten the overall length of the lens-barrel in a collapsed state.

Figure 6:
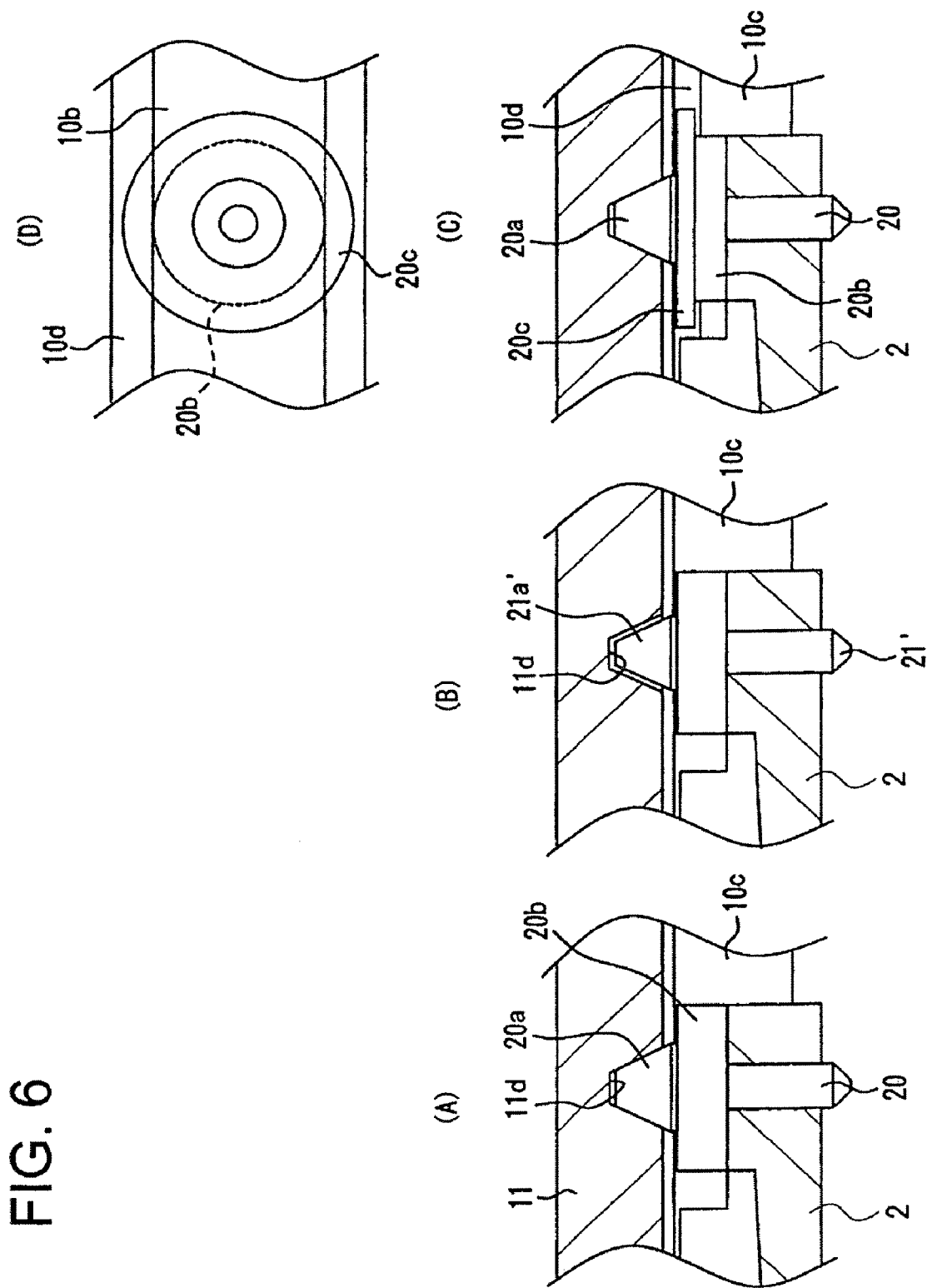
FIG. 6(A) is an enlarged cross-sectional view showing a relationship of engagement between the second lens holding member and fixed member in the lens-barrel of Embodiment 1 and FIGS. 6(B) to 6(D) are enlarged cross-sectional views showing a relationship of engagement between the second lens holding member and fixed member in a lens-barrel of each modification example.

FIG. 6(A) shows a relationship between the cam follower pin 20 attached to the second holding member 2 and the cam groove portion 11d formed in the cam member 11. The taper pin portion 20a of the cam follower pin 20 always engages with one of the three cam groove portions 11d formed on the inner surface of the cam member 11, when the cam member 11 rotates, the cam follower pin 20 receives a force from the cam groove portion 11d and moves the second holding member 2 forward and backward in the direction of the optical axis.

Since the pin 21 has no part corresponding to the taper pin portion 20a of the cam follower pin 20, the position of the second holding member 2 in the direction of the optical axis is only determined by the engagement between the cam follower pin 20 and cam groove portion 11d.

The shaft of the cam follower pin 20 is pressed in the direction of the cam groove portion 11d by a spring force of a blade spring 22 attached to the inner surface of the extended portion 2b which holds the cam follower pin 20. This prevents backlash in the engagement between the taper pin portion 20a of the cam follower pin 20 and the cam groove portion 11d.

However, when an external force such as shock applies to the second holding member 2 due to a drop of the camera, etc., the above described engagement between the cam follower pin 20 and cam groove portion 11d alone may not be enough to prevent the force applying only to the cam follower pin 20 causing the cam follower pin 20 to come off the cam groove portion 11d. Therefore, as shown in FIG. 6(B), the other two pins 21' (corresponding to the pin 21) are provided with a taper pin portion 21a' which normally does not engage with the cam groove portion 11d in such a way that when the cam follower pin 20 is about to come off the cam groove portion 11d, the taper pin portions 21a' of the two pins 21' contact the cam groove portion 11d and uniformly receive a force applied to the second holding member 2 at three locations in the circumferential direction, which prevents the cam follower pin 20 from coming off the cam groove portion 11d and becomes resistant to shock.

Furthermore, as shown in FIG. 6(C) and 6(D), by providing a step 10d in the rectilinear groove portion 10b of the fixed member 10 and forming a flange portion 20c as shown in the figure on the three pins 20 and 21, it is also possible to receive a force applied to the taper pin portion 20a by a fixed member 10.

In this embodiment, the three rectilinear groove portions 1a which guide the first holding unit 1 with respect to the fixed member 10 in the direction of the optical axis are also used as the optical axis direction guide on the front end side of the second holding member 2 and as the part which performs positioning in the direction perpendicular to the optical axis. This can reduce the number of rectilinear groove portions 1a which requires a high degree of mechanical accuracy and would cause a reduction of mechanical strength of the first holding unit 1, improves productivity and mechanical strength of the first holding unit 1 and provides a common positioning reference, and can thereby further improve the relative position accuracy of the first and second lens units L1 and L2.

Furthermore, since the three keys 2a on the front end side of the second holding member 2 and the cam follower pin 20 and pins 21 on the rear end side of the second holding member are arranged at the same phase angles, the keys 10a and the rectilinear groove portions 10b provided on the fixed member 10 are arranged at the same phase angle. Notches are formed on the inner radius side of the flange portion 10c of the fixed member 10 to allow the cam follower pin 20 and pins 21 provided in the second holding member 2 to build in the rectilinear groove portions 10b, but if the notches (rectilinear groove portions 10b) and keys 10a do not have the same angle phases, the thickness (size in the diameter direction) of the part (connection part) connected in the circumferential direction and positioned on the outer radius side of the notches in the flange portion 10c is small and the mechanical strength of the front part of the fixed member 10 reduces. That is, the fixed member 10 is bent due to insufficient strength of the three connection parts.

However, in this embodiment, the keys 10a and rectilinear groove portions 10b are provided with the same angle phases, thereby the keys 10a themselves also function as the above described connection parts and the thickness of the connection parts can be increased. Thus, it is possible to improve mechanical strength of the connection parts and suppress bending of the fixed member 10.

Figure 7:
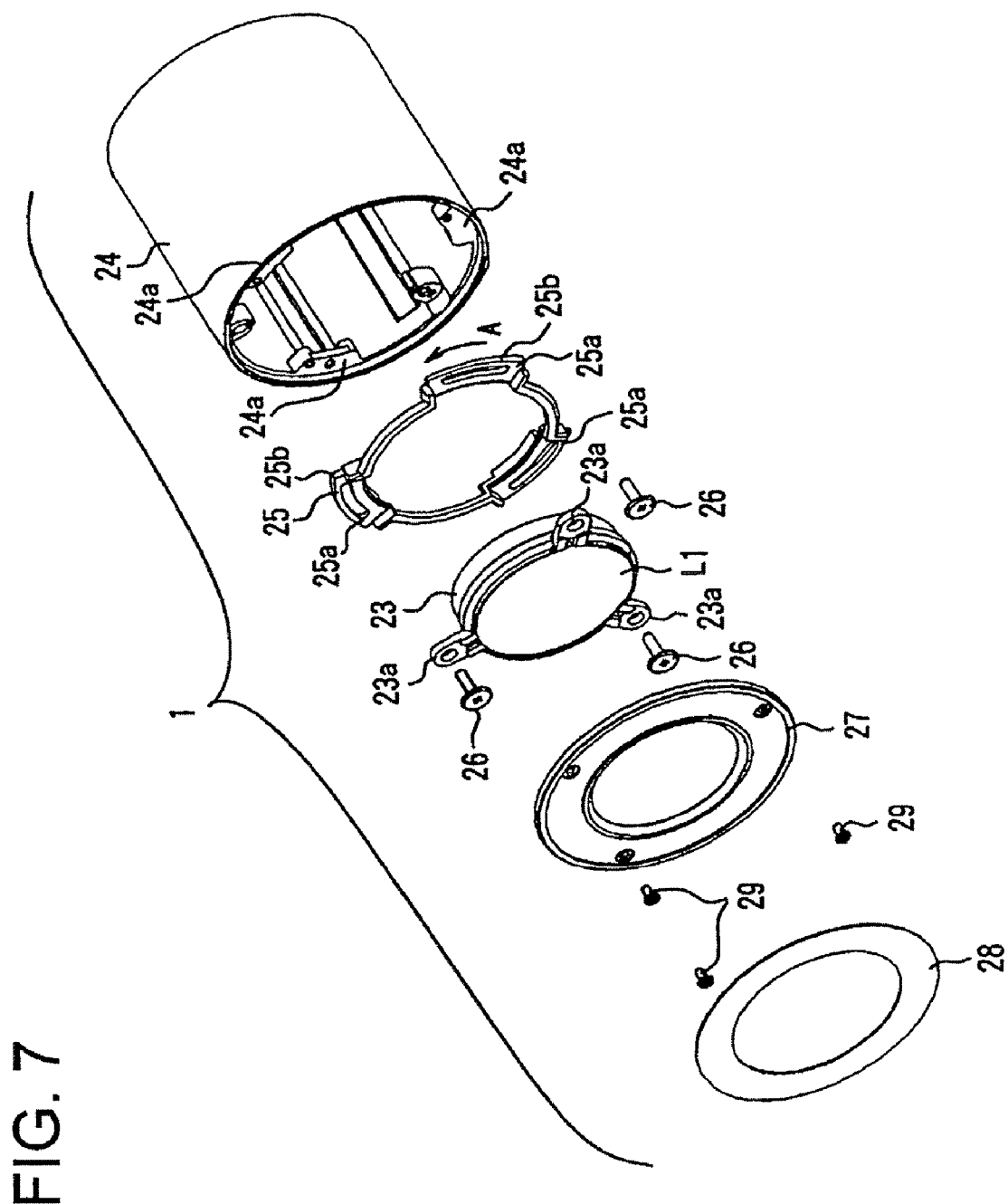
FIG. 7 is an exploded perspective view of the first lens holding member in the lens-barrel of Embodiment 1.

Then, the configuration of the first holding unit 1 will be explained using FIG. 7. FIG. 7 is an exploded perspective view of the first holding unit 1.

In this figure, reference numeral 23 denotes a lens holding frame which holds the first lens unit L1 and 24 denotes a guide member of the first holding unit 1, on the inner surface of which the aforementioned three rectilinear groove portions 1a are provided.

Reference numeral 25 denotes an intermediate ring inlaid between the lens holding frame 23 and the guide member 24 and is fixed by three screws 26. The intermediate ring 25 includes flat portions 25a which receive three screw stoppers 23a provided in the circumferential direction of the lens holding frame 23 and taper surfaces 25b whose thickness changes in the rotation direction (direction indicated by arrow A) provided at three locations on the back in the circumferential direction. The three taper surfaces 25b contact the three taper surfaces (surfaces having tapering corresponding to the taper surfaces 25b) 24a formed inside the guide member 24.

Thus, when the intermediate ring 25 is rotated around the optical axis, the lens holding frame 23 displaces in the direction of the optical axis due to a change in thickness of the taper surfaces 25b, making it possible to adjust the position of the first lens unit L1 in the direction of the optical axis inside the first holding unit 1.

Furthermore, the screws 26 have backlash with respect to the screw stoppers 23a in the direction perpendicular to the optical axis and it is thereby possible to adjust the position of the first lens unit L1 in the direction perpendicular to the optical axis inside the first holding unit 1 by sliding the screw stoppers 23a on the flat portions 25a of the intermediate ring 25.

A magnification varying optical system comprising four-lens units in this embodiment has a high magnification varying ratio (e.g., 6 times or more, especially 10 times or more) and there is a particularly strong demand for position accuracy of each lens unit, and therefore the first lens unit L1 is designed to be adjustable in the direction of the optical axis and in the direction perpendicular to the optical axis in order to secure the required optical performance.

The lens holding frame 23, guide member 24 and intermediate ring 25 are united by three screws 26 after the positions of the first lens unit L1 in the direction of the optical axis and in the direction perpendicular to the optical axis are adjusted.

Reference numeral 27 denotes a front mask to stop up an extra opening, which is fixed to the guide member 24 by screws 29. Reference numeral 28 denotes a decorative plate to cover the screws 29, which is fixed to the front mask 27 by means of adhesion, etc.

Figure 8:
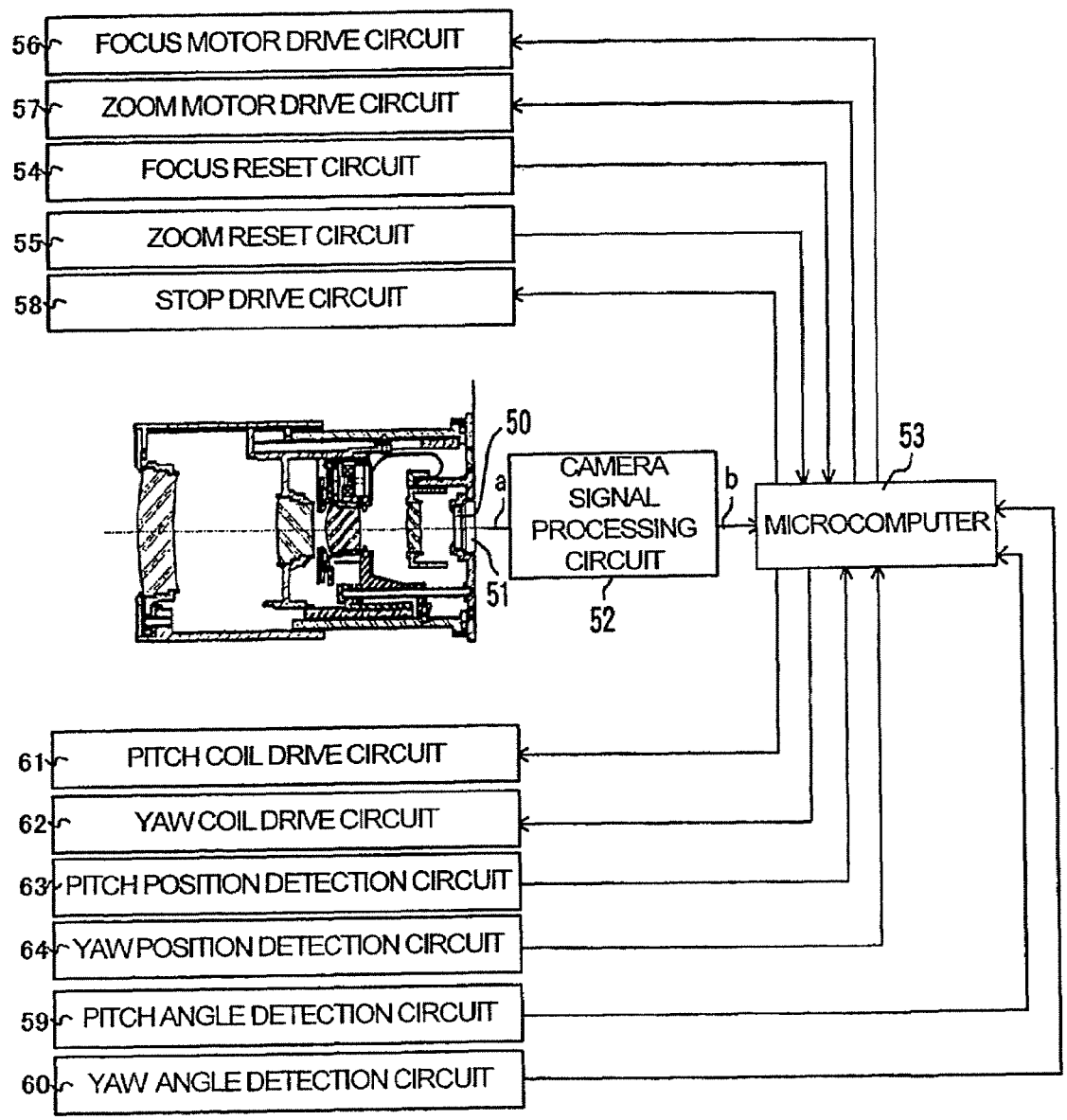
FIG. 8 is a system diagram of a camera incorporating the lens-barrel of Embodiment 1.

FIG. 8 is a system diagram showing an overall electric circuit configuration of a camera incorporating the lens-barrel having a vibration correction function of this embodiment. Hereinafter, this electric circuit configuration will be explained using FIG. 1 together.

An optical low pass filter 50 eliminates a high frequency component of a spatial frequency of an object. An image pickup element 51 converts an optical image formed on a focusing surface to an electric signal. An electric signal a read from the image pickup element 51 is subjected to various types of processing at a camera signal processing circuit 52 and output as an image signal b from the camera signal processing circuit 52.

Reference numeral 53 denotes a microcomputer which controls lens driving. When power is turned on, the microcomputer 53 monitors outputs of a focus reset circuit 54 and a zoom reset circuit 55, rotates the focus motor unit 14 and the zoom motor unit 15 which are made up of stepping motors through a focus motor drive circuit 56 and a zoom motor drive circuit 57 respectively, moves the respective lens units in the direction of the optical axis to carry out focusing and magnification varying operations.

The focus reset circuit 54 and zoom reset circuit 55 include the aforementioned focus reset switch 16 and the zoom reset switch 17. The outputs from the focus reset circuit 54 and zoom reset circuit 55 are inverted when the light-blocking portions 4c and 18a move forward and backward between the light projection portions and light reception portions of the focus reset switch 16 and the zoom reset switch 17 and reach the boundary between a light-blocking state and light-transmitted state. By counting the number of driving steps of the motor units 14 and 15 after the outputs are inverted in the microcomputer 53 using the position in the direction of the optical axis of the fourth holding member 4 and rotation position of the cam member 11 when the outputs are inverted as a reference, the microcomputer 53 can detect the absolute positions of the respective lens units. In this way, accurate focal length information is obtained. This series of operations is called a "focus and zoom reset operation."

Reference numeral 58 denotes a stop drive circuit which drives the stop unit 13, drives a stop actuator 13a and controls the stop aperture diameter based on brightness information b of the image signal taken into the microcomputer 53.

Reference numerals 59 and 60 denote angle detection circuits provided in the lens-barrel or camera body. The angle detection circuits 56 and 60 output a signal according to an inclination angle in the camera PITCH direction (vertical direction) and an inclination angle in the YAW direction (horizontal direction). The inclination angles are detected by integrating the output of an angular velocity sensor such as a vibration gyro.

The output of the angle detection circuit 59 or 60, that is, information on the inclination angle of the camera is taken into the microcomputer 53. Reference numerals 61 and 62 denote PITCH (vertical direction) and YAW (horizontal direction) coil drive circuits respectively which shift the third lens unit L3 in the direction perpendicular to the optical axis to perform image vibration correction. The respective coil drive circuits 61 and 62 generate a driving force to shift the third lens unit L3 in a so-called moving coil configuration which a coil is placed in a gap of a magnetic circuit including a magnet.

Reference numerals 63 and 64 denote PITCH (vertical direction) and YAW (horizontal direction) position detection circuits respectively to detect an amount of shift of the third lens unit L3 with respect to the optical axis. The shift amount information from the respective position detection circuits 63 and 64 is taken into the microcomputer 53. When the third lens unit L3 is shifted in the direction perpendicular to the optical axis, the optical axis of a light flux which passes through the third lens unit L3 is bent and the position of the image of the object formed on the image pickup element 51 moves. By controlling the shift of the third lens unit L3 through the microcomputer 53 in such a way that the amount of shift of the image at this time is the same as the amount of shift in a direction opposite to the direction in which the image has moved because of the actual inclination of the camera, it is possible to realize so-called image vibration correction whereby the image formed on the image pickup element 51 does not move even if the camera is inclined due to the movement of the hand.

The microcomputer 53 subtracts shift amount signals of the third lens unit L3 obtained from the PITCH position detection circuit 63 and YAW position detection circuit 64 from the camera inclination angle signals obtained from the PITCH angle detection circuit 59 and YAW angle detection circuit 60, amplifies their respective differential signals, and sends the drive signals obtained by appropriate phase compensation of differential signals to the PITCH coil drive circuit 61 and YAW coil drive circuit 62. In this way, the PITCH coil drive circuit 61 and YAW coil drive circuit 62 shift the third lens unit L3. Through this control, the position of the third lens unit L3 is controlled in such a way that the above described differential signal becomes small and the third lens unit L3 is kept at a target position.

Furthermore, the lens-barrel of this embodiment performs a magnification varying operation through relative movements of the first to third lens units L1 to L3 and the amount of movement of the image with respect to the amount of shift of the third lens unit L3 changes depending on the focal length, and therefore instead of determining the amount of shift of the third lens unit L3 using the camera inclination signal obtained by the PITCH angle detection circuit 59 and YAW angle detection circuit 60 as they are, this embodiment performs correction according to focal length information and cancels out the movement of the image due to the inclination of the camera by shifting the third lens unit L3.

Embodiment 2

Figure 9:
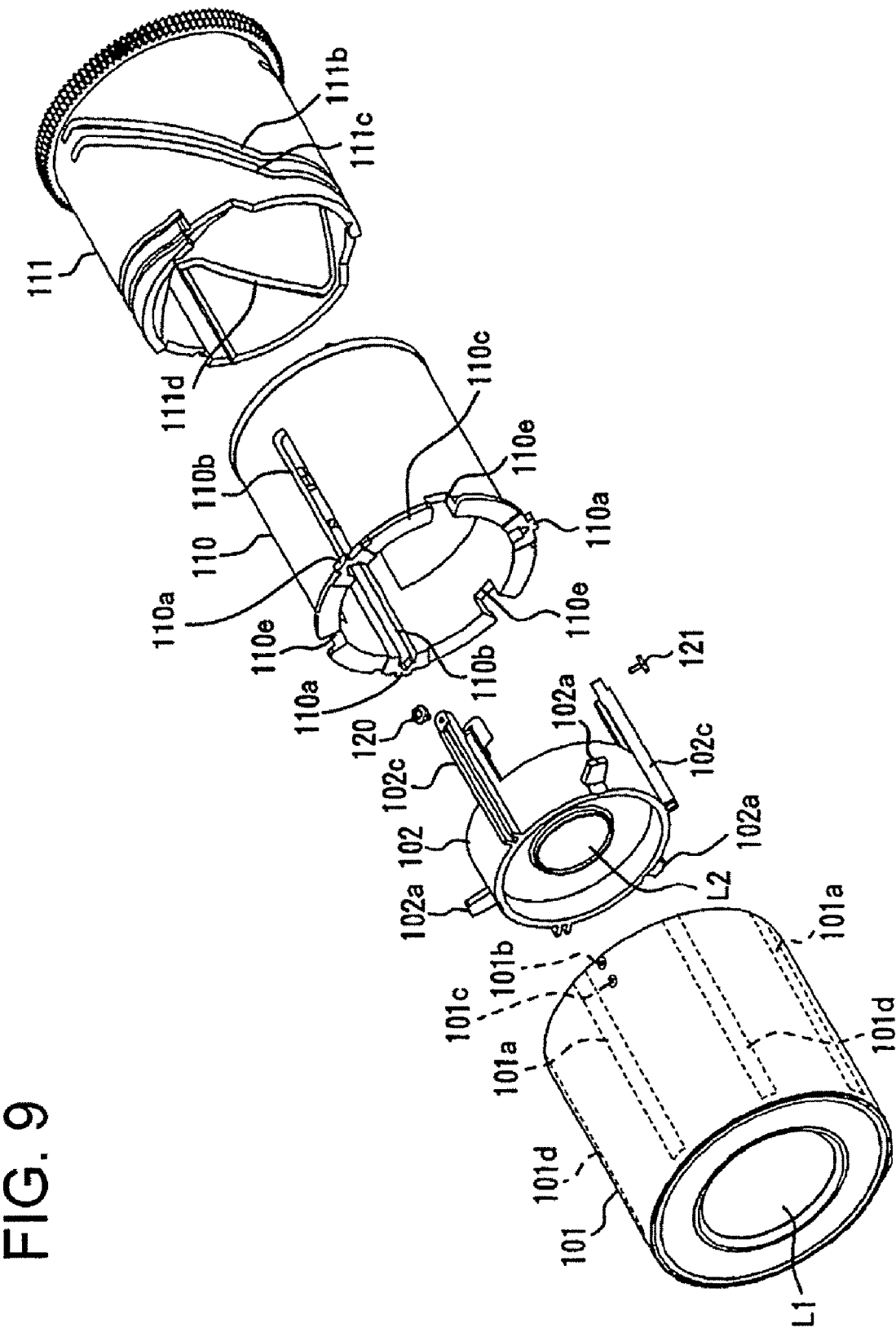
FIG. 9 is an exploded perspective view of a lens-barrel which is Embodiment 2 of the present invention.

FIG. 9 is an exploded perspective view of components related to the support configurations of first and second lens units L1 and L2 in a lens-barrel which is Embodiment 2 of the present invention. The configuration of a magnification varying image-taking optical system according to this embodiment is the same as that of Embodiment 1.

In FIG. 9, reference numeral 101 denotes a first holding unit which holds a first lens unit L1, 102 denotes a second holding member which holds a second lens unit L2, 110 denotes a fixed member, 111 denotes a cam member and the basic configuration of these members is the same as that of Embodiment 1. Therefore, detailed explanations of parts common to those of Embodiment 1 will be omitted.

The first holding unit 101 is supported in the direction perpendicular to the optical axis by the fixed member 110 and cam member 111 and guided in the direction of the optical axis in the same configuration as that of Embodiment 1. That is, keys (support portions) 110a formed at three locations in the circumferential direction of a flange portion 110c at the front end of the fixed member 110 engage with three rectilinear groove portions 101a formed on the inner surface of the first holding unit 101, and cam follower pins 101b and an anti-shock pin 101c provided at three locations in the circumferential direction on the inner surface of the first holding unit 101 engage with three cam groove portions 111b and 111c provided on the outer surface of the cam member 111. This makes sure that the inclination of the first holding unit 101 is suppressed.

The second holding member 102 is supported in such a way that the rear end side of its extended portion 102c is positioned in the direction perpendicular to the optical axis by the rectilinear groove portion 110b of the fixed member 110 through three pins (cam follower pin 120 and two pins 121: second supported portions) arranged at equiangular intervals in the circumferential direction, and guided in the direction of the optical axis as well. Here, the cam follower pin 120 engages with a cam groove portion 111d provided on the inner surface of the cam member 111.

Furthermore, three keys (first supported portions) 102a are formed on the front end side of the second holding member 102 in the circumferential direction with angle phases different from those of the above described three pins. These keys 102a are engaged with three rectilinear groove portions 101d respectively formed in such a way as to extend in the direction of the optical axis with angle phases different from those of the above described three rectilinear groove portions 101a in the circumferential direction on the inner surface of the first holding unit 101 and the front end side of the second holding member 102 is thereby supported by the first holding unit 101 in such a way that the front end side of the second holding member 102 is positioned in the direction perpendicular to the optical axis with respect to the first holding unit 101, and guided in the direction of the optical axis.

Thus, as in the case of Embodiment 1, this embodiment determines the positions in the direction perpendicular to the optical axis of the first holding unit 101 and second holding member 102 using the fixed member 110 as a reference and the position in the direction perpendicular to the optical axis is also determined by the cam member 111 or first holding unit 101, and therefore the inclination of the first and second lens units L1 and L2 with respect to the design optical axis in the lens-barrel is reliably suppressed.

Furthermore, the second holding member 102 is supported by the first holding unit 101 on its front end side and the position of the second holding member 102 in the direction perpendicular to the optical axis with respect to the first holding unit 101 is determined. The second holding member 102 is supported by the fixed member 110 on its rear end side and the position in the direction perpendicular to the optical axis with respect to the fixed member 110 is determined. In this way, a relative positional difference (optical axis difference) between the first lens unit L1 and second lens unit L2 can be minimized to a minimum level.

Furthermore, by shifting the angle phases of the keys 110a which support and guide the first holding unit 101 in the fixed member 110 from the angle phases of the keys 102a of the second holding member 102, this embodiment allows the keys 102a to be accommodated in the concave portion (housing portion) 110e formed at the front end of the fixed member 110 and makes it possible to shorten the overall length of the lens-barrel in a collapsed state compared to that of Embodiment 1.

This embodiment has described the case where the keys 102a are provided on the cylindrical part of the second holding member 102, but it is also possible to provide an extended portion which extends forward in the direction of the optical axis on the cylindrical part and provide keys at the front end of the extended portion.

Embodiment 3

Of a lens-barrel which is Embodiment 3 of the present invention, FIG. 10 and FIGS. 11(A), 11(B) and 11(C) show exploded perspective views of components related to the support configurations of third and fourth lens units L3 and L4 of a magnification varying image-taking optical system in the same four lens unit configuration as that of Embodiment 1. However, the magnification varying image-taking optical system of this embodiment does not have a function of correcting image vibration by shifting the third lens unit L3.

Figure 10:
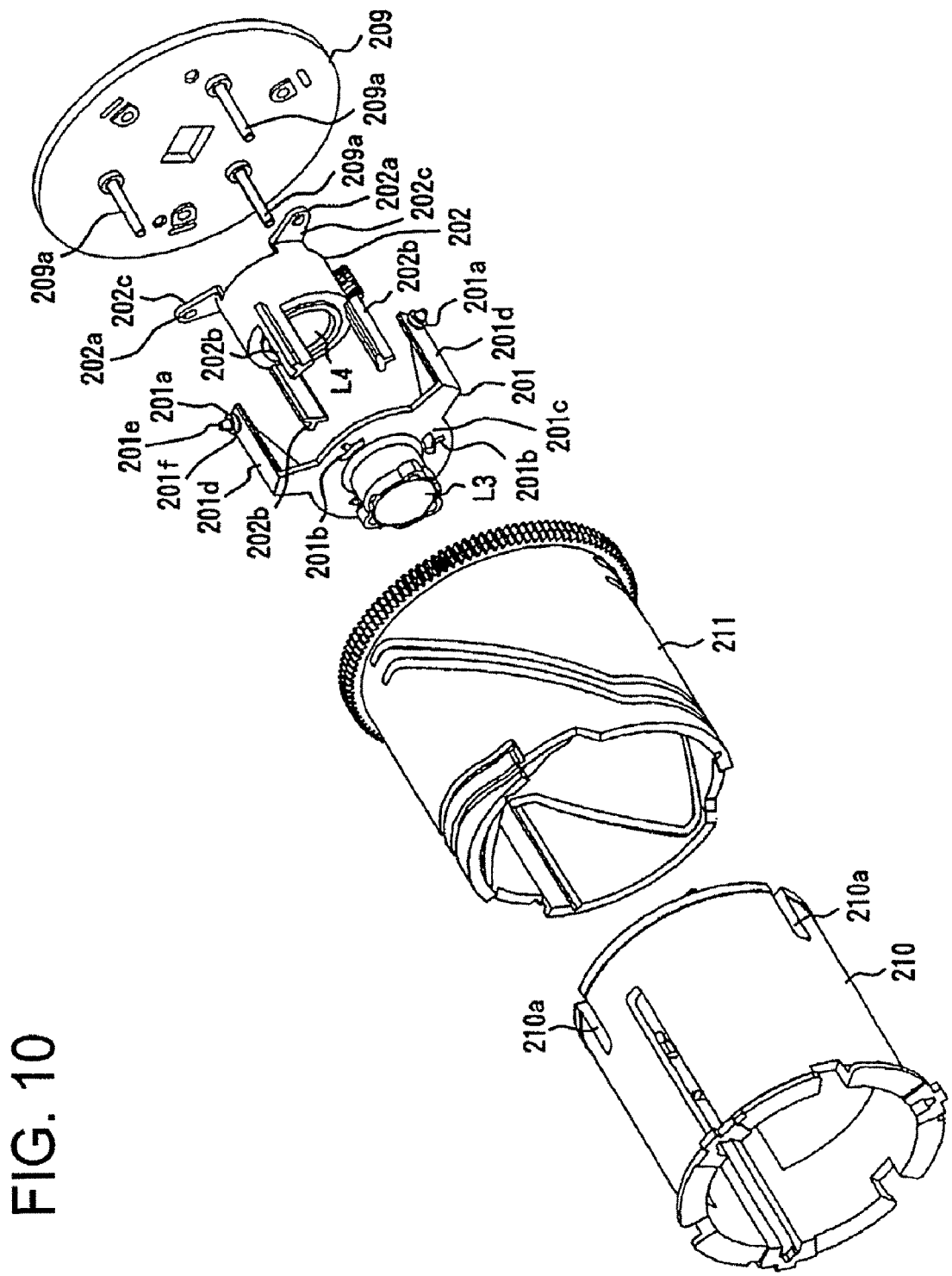
FIG. 10 is an exploded perspective view of a lens-barrel which is Embodiment 3 of the present invention.

In FIG. 10, reference numeral 201 denotes a third holding member (first lens holding member) which holds the third lens unit L3 and 202 denotes a fourth holding member (second lens holding member) which holds the fourth lens unit L4. Reference numeral 210 denotes a fixed member, 211 denotes a cam member which rotates around the fixed member 210. Reference numeral 209 denotes a rear frame which is connected to the fixed member 210 as an integral part thereof by three screws (not shown) and forms part of the fixed member 210. Though not shown, the lead screw 14a of the focus motor unit 14 explained in Embodiment 1 becomes a driving member of the fourth holding member 202 in this embodiment.

In the third holding member 201, a flange portion 201c which juts outward in the diameter direction is formed at the rear end of the cylindrical part which holds the third lens unit L3. Furthermore, extended portions 201d which extend backward are formed at three locations in the circumferential direction of the flange portion 201c at equiangular intervals and a cam follower pin 201a having a taper pin portion 201e and cylindrical pin portion 201f is formed at the rear end of each extended portion 201d.

The cylindrical pin portions 201f of the cam follower pins 201a engage with three rectilinear groove portions (support portions) 210a formed at the rear of the fixed member 210. This causes the third holding member 201 to be supported to the fixed member 210 in such a way as to be positioned in the direction perpendicular to the optical axis and guided along the rectilinear groove portions 210a in the direction of the optical axis. Furthermore, with the taper pin portions 201e of the cam follower pins 201a engaged with three cam groove portions (not shown) formed on the inner surface of the cam member 211, the inclination of the third holding member 201 is suppressed and the third holding member 201 which receives a force from the cam groove portion when the cam member 211 rotates is driven in the direction of the optical axis.

At three locations on the cylindrical part which holds the fourth lens unit L4 of the fourth holding member 202 in the circumferential direction at equiangular intervals, there are legs 202c jutting outward in the diameter direction and a long hole (second supported portion) 202a which is slightly long in the radial direction centered on the optical axis is formed in each leg 202c. Guide bars 209a fixed in such a way as to extend forward from three locations at equiangular intervals in the circumferential direction of the rear frame 209 in substantially parallel to the optical axis are fitted into these long holes 202a and the guide bars 209a engage with the inner sides of the long holes 202a. This causes the fourth holding member 202 to be supported by the rear frame 209 (that is, fixed member 210) in such a way as to be positioned with respect to the rear frame 209 in the direction perpendicular to the optical axis and guided along the guide bars 209a in the direction of the optical axis.

Furthermore, at three locations (however, positions with different phases from those of the legs 202c) at equiangular intervals in the circumferential direction of the cylindrical part of the fourth holding member 202, there are guide portions (first supported portions) 202b extending forward in substantially parallel to the optical axis. These guide portions 202b are fitted into and engaged with guide holes 201b formed at three locations in circumferential direction of the flange portion 201c of the third holding member 201. In this way, the front end side of the fourth holding member 202 is supported by the third holding member 201 in such a way as to be positioned with respect to the third holding member 201 in the direction perpendicular to the optical axis and guided in the direction of the optical axis.

The cross-section of the guide portions 202b (and guide holes 201b) is T-shaped for the purpose of improving rigidity of the guide portions 202b and reliably guiding the guide portions 202b in the direction of the optical axis.

Figure 11:
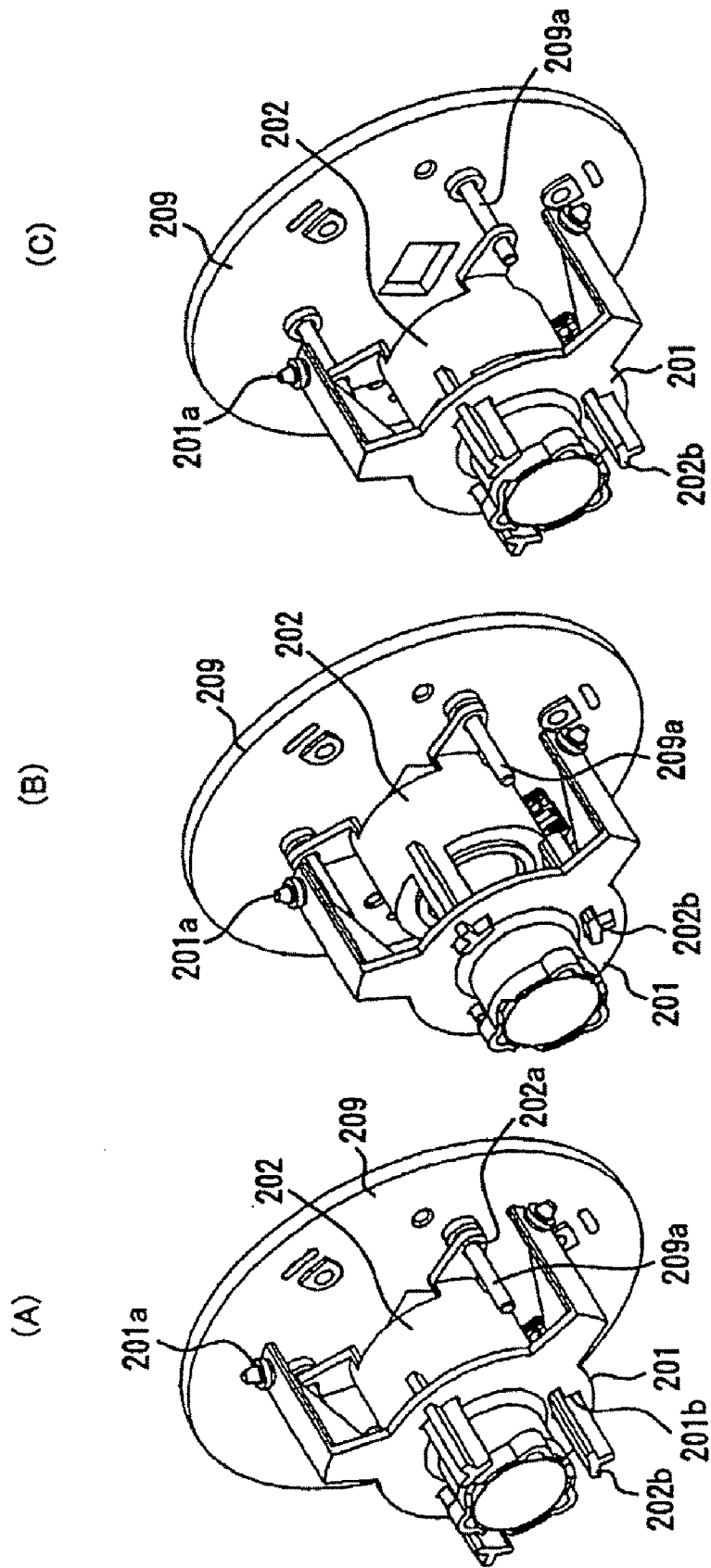
FIGS. 11(A) to 11(C) are perspective views of some parts of the lens-barrel of Embodiment 3 when some parts are assembled.

FIGS. 11(A), 11(B) and 11(C) illustrate a positional relationship between the third holding member 201, fourth holding member 202 and rear frame 209 when they are assembled. FIG. 11(A) shows a collapsed state in which both the third holding member 201 and fourth holding member 202 are fully retreated and FIG. 11(B) shows a WIDE end state in which the third holding member 201 is moved forward to the full. FIG. 11(C) shows a TELE end state in which both the third holding member 201 and fourth holding member 202 are moved forward to the full.

As is apparent from these figures, in this embodiment, the positions in the direction perpendicular to the optical axis of both the third holding member 201 and fourth holding member 202 relative to the fixed member 210 (fixed member 210 or guide bars 209a of rear frame 209 which forms part thereof) is determined and their positions in the direction perpendicular to the optical axis according to the cam member 211 or third holding member 201 is also determined, and therefore the inclination of the third and fourth lens units L3 and L4 in the lens-barrel with respect to the design optical axis is reliably suppressed.

Furthermore, the fourth holding member 202 is supported by the rear frame 209 (guide bars 209a) which forms part of the fixed member 210 and the third holding member 201 in such a way as to be positioned in the direction perpendicular to the optical axis at positions separated back and forth in the direction of the optical axis and the inclination of the lens-barrel with respect to the optical axis is suppressed, and therefore even if the third holding member 201 moves in the direction perpendicular to the optical axis due to backlash in the engagement between the cam follower pins 201a and rectilinear groove portions 210a of the fixed member 210, and non-uniformity of three cam groove portions of the cam member 211 with which the three cam follower pins 201a are engaged, the front end side of the fourth holding member 202 supported by the third holding cylinder 201 moves following the third holding member 201, and it is thereby possible to suppress a relative positional difference (optical axis difference) between the third lens unit L3 and fourth lens unit L4 to a minimum.

Furthermore, this embodiment uses the guide bars 209a whose one end is supported to support the fourth holding member 202, the guide bars 209a is provided at three locations in the circumferential direction and the front end side of the fourth holding member 202 is supported by the third holding cylinder 201, and therefore a danger of an inclination of the fourth holding member 202 due to bending of the guide bars 209a can be reduced and the inclination of the fourth holding member 202 can be suppressed without the need to provide any sleeve portion, which is long in the direction of the optical axis, engaged with the guide bars 209a. This embodiment can thereby shorten the overall length of the lens-barrel in a collapsed state.

Embodiment 4

Figure 12:
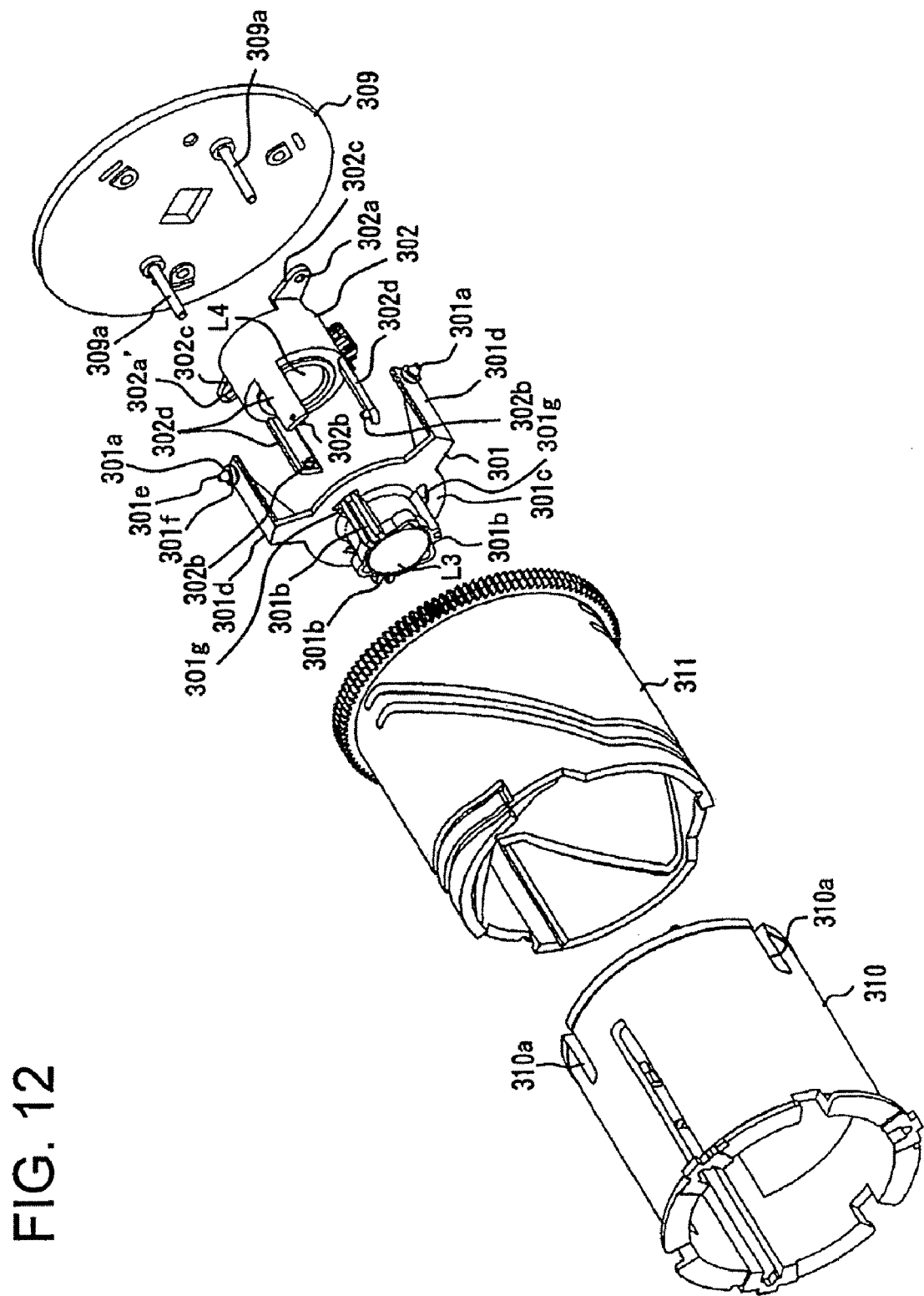
FIG. 12 is an exploded perspective view of a lens-barrel which is Embodiment 4 of the present invention.

Of the lens-barrel which is Embodiment 4 of the present invention, FIG. 12 shows an exploded perspective view of components related to the support configurations of third and fourth lens units L3 and L4 in a magnification varying image-taking optical system in the same four lens unit configuration as that of Embodiment 1. The magnification varying image-taking optical system of this embodiment does not have a function of correcting image vibration by shifting the third lens unit L3, either.

In FIG. 12, reference numeral 301 denotes a third holding member (first lens holding member) which holds the third lens unit L3 and 302 denotes a fourth holding member (second lens holding member) which holds the fourth lens unit L4. Reference numeral 310 denotes a fixed member and 311 denotes a cam member which rotates around the fixed member 310. Reference numeral 309 denotes a rear frame, which is connected to the fixed member 310 as an integral part thereof by three screws (not shown) and forms part of the fixed member 310. Furthermore, though not shown, the lead screw 14a of the focus motor unit 14 explained in Embodiment 1 constitutes a driving member of the fourth holding member 302 of this embodiment.

A flange portion 301c jutting outward in the diameter direction is formed at the rear end of the cylindrical part which holds a third lens unit L3 in a third holding member 301. Furthermore, at three locations at equiangular intervals in the circumferential direction of the flange portion 301c, there are extended portions 301d which extend backward and a cam follower pin 301a having a taper pin portion 301e and a cylindrical pin portion 301f is provided at the rear end of each extended portion 301d.

The cylindrical pin portions 301f of the cam follower pins 301a engage with three rectilinear groove portions (support portions) 310a formed at the rear of the fixed member 310. In this way, the third holding member 301 is supported in such a way as to be positioned with respect to the fixed member 310 in the direction perpendicular to the optical axis and guided along the rectilinear groove portions 310a in the direction of the optical axis. Furthermore, with the taper pin portions 301e of the cam follower pins 301a engaged with three cam groove portions (not shown) formed on the inner surface of the cam member 311, the inclination of the third holding member 301 is suppressed and the third holding member 301 which receives a force from the cam groove portions through the rotation of the cam member 311 is driven in the direction of the optical axis.

At two locations opposed to each other centered on the optical axis of the cylindrical part which holds the fourth lens unit L4 of the fourth holding member 302, there are legs 302c extending outward in the diameter direction and a circular hole (second supported portion) 302a is formed in one leg 302c and a long hole (second supported portion) 302a' which is slightly long in the diameter direction and extends from the optical axis to the other leg 302c is formed in the leg 302c.

Guide bars 309a fixed so as to extend forward from two locations opposed to each other centered on the optical axis of the rear frame 309 in substantially parallel to the optical axis are fitted into the hole 302a and long hole 302a'. The guide bar 309a engages with the hole 302a and the guide bar 309a engages with the inner side of the long hole 302a'. In this way, the fourth holding member 302 is supported by the rear frame 309 (that is, fixed member 310) in such a way as to be positioned with respect to the rear frame 309 in the direction perpendicular to the optical axis and also guided along the guide bar 309a in the direction of the optical axis.

Furthermore, at three locations (however, at positions with different phases from those of the legs 302c) at equiangular intervals in the circumferential direction of the cylindrical part of the fourth holding member 302, there are extended portions 302d which extend forward in substantially parallel to the optical axis. These extended portions 302d penetrate holes 301g formed at three locations in the circumferential direction of the flange portion 301c of the third holding member 301. Furthermore, a cylindrical pin (first supported portion) 302b is provided on the inner side at the front end of each extended portion 302d.

On the other hand, at three locations (positions with the same phase as the holes 301g) at equiangular intervals in the circumferential direction of the cylindrical part which holds the third lens unit L3 in the third holding member 301, there are guide rail portions 301b which extend in the direction of the optical axis. These guide rail portions 301b engage with the cylindrical pins 302b provided on the extended portions 302d which penetrate the holes 301g of the fourth holding member 302.

In this way, the front end side of the fourth holding member 302 is supported by the third holding member 301 in such a way as to be positioned with respect to the third holding member 301 in the direction perpendicular to the optical axis and also guided in the direction of the optical axis.

Figure 13:
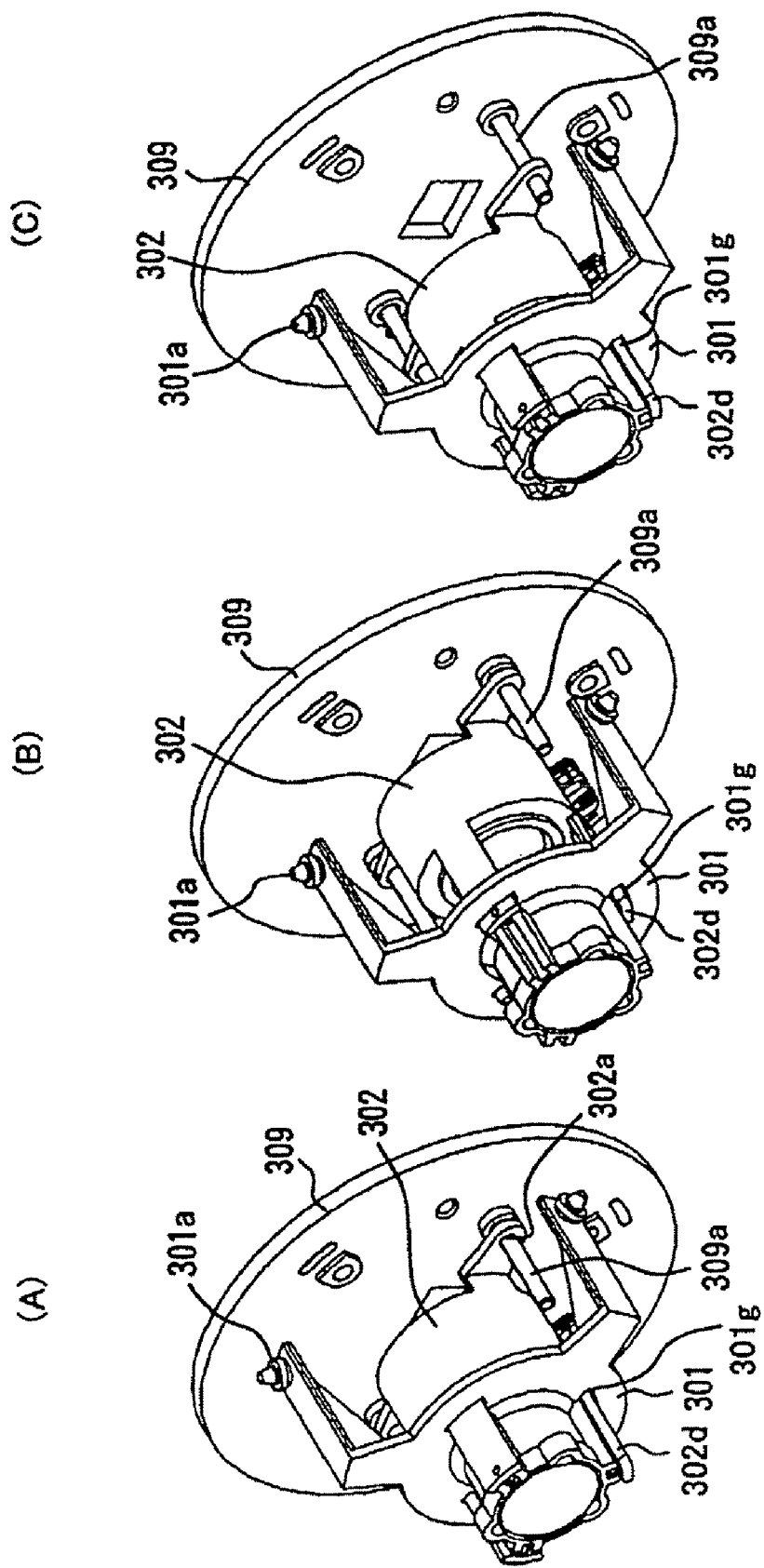
FIGS. 13(A) to 13(C) are perspective views of some parts of the lens-barrel of Embodiment 4 of the present invention.

FIGS. 13(A), 13(B) and 13(C) show a positional relationship between the third holding member 301, fourth holding member 302 and rear frame 309 when they are assembled. FIG. 13(A) shows a collapsed state in which both the third holding member 301 and fourth holding member 302 are fully retreated and FIG. 13(B) shows a WIDE end state in which the third holding member 301 is moved forward to the full. FIG. 13(C) shows a TELE end state in which both the third holding member 301 and fourth holding member 302 are moved forward to the full.

As is apparent from these figures, in this embodiment, the positions in the direction perpendicular to the optical axis of both the third holding member 301 and fourth holding member 302 relative to the fixed member 310 (fixed member 310 or guide bars 309a of rear frame 309 which forms part thereof) is determined and their positions in the direction perpendicular to the optical axis according to the cam member 311 or third holding member 301 is determined, and therefore the inclination of the third and fourth lens units L3 and L4 in the lens-barrel with respect to the design optical axis can be reliably suppressed.

Furthermore, the fourth holding member 302 is supported by the rear frame 309 (guide bars 309a) which forms part of the fixed member 310 and the third holding member 301 in such a way as to be positioned in the direction perpendicular to the optical axis at positions separated back and forth in the direction of the optical axis and the inclination of the lens-barrel with respect to the optical axis is suppressed, and therefore even if the third holding member 301 moves in the direction perpendicular to the optical axis due to backlash in the engagement between the cam follower pins 301a and rectilinear groove portions 310a of the fixed member 310, and non-uniformity of three cam groove portions of the cam member 311 with which the three cam follower pins 301a are engaged, the front end side of the fourth holding member 302 supported by the third holding member 301 moves following the third holding member 301, and it is thereby possible to suppress a relative positional difference (optical axis difference) between the third lens unit L3 and fourth lens unit L4 to a minimum.

Furthermore, this embodiment uses the guide bars 309a whose one end is supported to support the fourth holding member 302, the guide bars 309a is provided at two locations in the circumferential direction and the front end side of the fourth holding member 302 is supported by the third holding member 301, and therefore a danger of an inclination of the fourth holding member 302 due to bending of the guide bar 309a can be reduced and the inclination of the fourth holding member 302 can be suppressed without the need to provide any sleeve portion, which is long in the direction of the optical axis, and engage with the guide bars 309a in the fourth holding member 302. This embodiment can thereby shorten the overall length of the lens-barrel in a collapsed state.

These are explanations of the embodiments of the present invention, but the present invention is not limited to the configurations of the above described embodiments and any configuration can be used if it is at least defined in the claims.

For example, Embodiments 1 and 2 have described the case where keys serving as a convex portions are provided in the second holding member 2 and the keys engage with the concave rectilinear groove portions serving a concave portions formed in the first holding member 1, but the present invention can also be implemented by inverting this concavo-convexo relationship and providing concave portions in the second holding member 2 and convex portions in the first holding member and engaging these portions with each other.

The above described embodiments have described the lens apparatus used in a lens-integral type camera, but the present invention is also applicable to an interchangeable lens apparatus.

While preferred embodiments have been described, it is to be understood that modification and variation of the present invention may be made without departing from scope of the following claims.

What is claimed is:

1. A lens apparatus comprising:
a fixed member which constitute a body of the apparatus;
first and second lens holding members which hold respective lens units and are movable in the direction of the optical axis with respect to the fixed member; and
a driving member which engage the first and second lens holding members and drives these first and second lens holding members in the direction of the optical axis,
wherein the fixed member is provided with a support portion which supports the first lens holding member in the direction perpendicular to the optical axis, and
the second lens holding member is provided with a first supported portion supported by the first lens holding member in the direction perpendicular to the optical axis and a second supported portion supported by the fixed member in the direction perpendicular to the optical axis at positions separate from each other in the direction of the optical axis and at least two locations around the optical axis.

2. The lens apparatus according to claim 1, wherein a part which supports the second supported portion in the fixed member is formed in the peripheral wall housing the first and second lens holding members in the fixed member.

3. The lens apparatus according to claim 1, wherein the fixed member is provided with a housing portion which houses the supported portion of the second lens holding member which has been moved to the fixed member side in the direction of the optical axis.

4. The lens apparatus according to claim 1, wherein the first lens holding member holds the front lens unit of a plurality of lens units provided in the apparatus.

5. The lens apparatus according to claim 1, wherein both the first and second lens holding members move in the direction of the optical axis during a magnification varying operation.

6. A camera comprising:
the lens apparatus according to claim 1; and
a recording unit which records an image of an object formed by the lens apparatus.

* * * * *